TREATMENT HEAD WITH TUNING MEANS

Filed April 2, 1965 2 Sheets-Sheet 1

INVENTORS.
WILLIAM DENIS KENDALL
FRANK A. YARGER
BY White & Haefliger
ATTORNEYS.

TREATMENT HEAD WITH TUNING MEANS

Filed April 2, 1965 2 Sheets-Sheet 2

INVENTORS.
WILLIAM DENIS KENDALL
FRANK A. YARGER
BY White & Haefliger
ATTORNEYS.

United States Patent Office 3,368,565

Patented Feb. 13, 1968

3,368,565
ELECTROTHERAPEUTIC TREATMENT HEAD WITH TUNING MEANS

William Denis Kendall, Los Angeles, and Frank A. Yarger, Sylmar, Calif., assignors, by direct and mesne assignments, to Dynapower Systems Corporation of California, Santa Monica, Calif., a corporation of California Continuation-in-part of application Ser. No. 304,468, Aug. 26, 1963. This application Apr. 2, 1965, Ser. No. 445,111

3 Claims. (Cl. 128—404)

ABSTRACT OF THE DISCLOSURE

The disclosure concerns an electrotherapeutic treatment head incorporating within a metallic shell primary and secondary coils, an adjustable capacitor having flexed plates and a tuner for the capacitor. In order to facilitate adjustment of the tuner, a tubular guide is provided to extend within the shell in alignment with the tuner and a side opening in the shell to receive insertion of an elongated tool operable to adjust the tuner.

This application constitutes a continuation-in-part of our prior application, "High Performance Electrotherapeutic Treatment Head," Ser. No. 304,468, filed Aug. 26, 1963, now U.S. Patent 3,270,746.

This invention relates generally to electrotherapeutic apparatus, and more particularly concerns high-performance treatment heads associated with such apparatus.

In our U.S. Patent 3,127,895 we have described apparatus for generating, controlling and transmitting electrical pulses of high frequency for application to a patient by means of a treatment head. The latter is supplied with high voltage which is increased even further by means of high voltage primary and secondary coils. A high voltage capacitor is also used at the head, and it becomes important that the capacitor be capable of simple, accurate, reliable and rapid adjustment, as for example at the factory, and to maintain that adjustment in use, in order that the treatment head may have proper impedance relation to the patient.

The present invention contemplates an unusually effective solution to the problems posed by the above stated requirements as to capacitor adjustment. Basically, the invention concerns the provision of an adjustable tuner for the capacitor carried within the treatment head shell, and also a tubular guide extending within the shell in alignment with the tuner and a side opening in the shell to receive insertion of an elongated tool operable to adjust the tuner. Typically, the capacitor has a pair of plates movable relatively toward and away from each other while flexed and in response to adjustment of the tuner, and means mounting the plates and restraining edge portions of both plates against such relative movement.

More specifically, the tubular guide comprises a dielectric material and has one end portion supported at the tuner and another end portion supported at the shell. As a result, guided access to the tuner can be easily had by the tool inserted into the tube, and also there is no danger of high voltage arcing from the capacitor to the shell during operation of the treatment head. Further, the tuner typically comprises a dielectric screw fastener projecting between the plates, adjustment rotation of the fastener being resisted by the flexed condition of the plates, thereby to provide a very simple yet highly effective tuning adjustment of the plates while they remain securely supported at all times.

These and other objects and advantages of the invention, as well as the details of illustrative embodiments, will be more fully understood from the following detailed description of the drawings in which.

Figure 1:
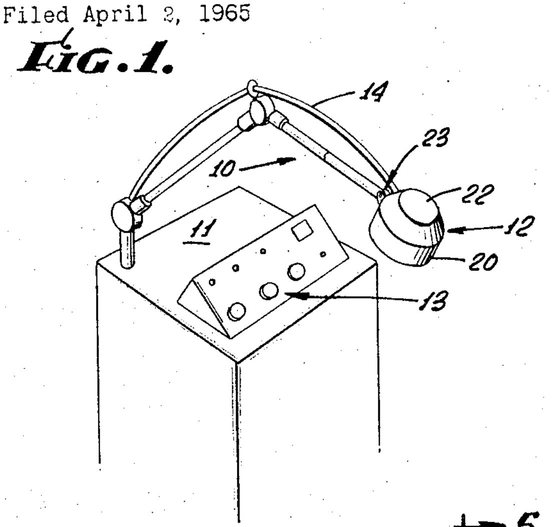
FIG. 1 is a perspective showing of electrotherapeutic equipment with which the invention is associated.

In FIG. 1, an arm assembly 10 is seen in combination with a cabinet top 11, and an electrotherapeutic treatment head 12, the latter being supported by the arm assembly. Controls 13 located on the cabinet top may be manipulated for controlling the amplitude and recurrence interval of pulses supplied to the head, it being understood that a high voltage coaxial cable 14 runs from the electrical apparatus contained in the cabinet and to the head.

Figure 2:
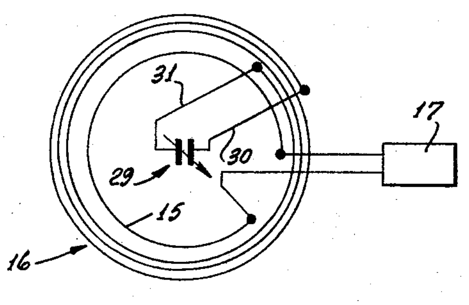
FIG. 2 is a circuit diagram showing the primary and secondary coils of the treatment head structure, together with block form means to transmit pulsed electrical energy thereto.

Reference to FIG. 2 indicates the electrical schematic of the circuit including the primary and secondary coils 15 and 16 at the head. Pulses transmitted by the means 17, representative of the apparatus contained in the cabinet, are typically characterized as made up of bursts of signal frequencies of about 27.12 megacycles, the pulse recurrence interval being, for example, 390 microseconds to 10 milliseconds.

Figure 3:
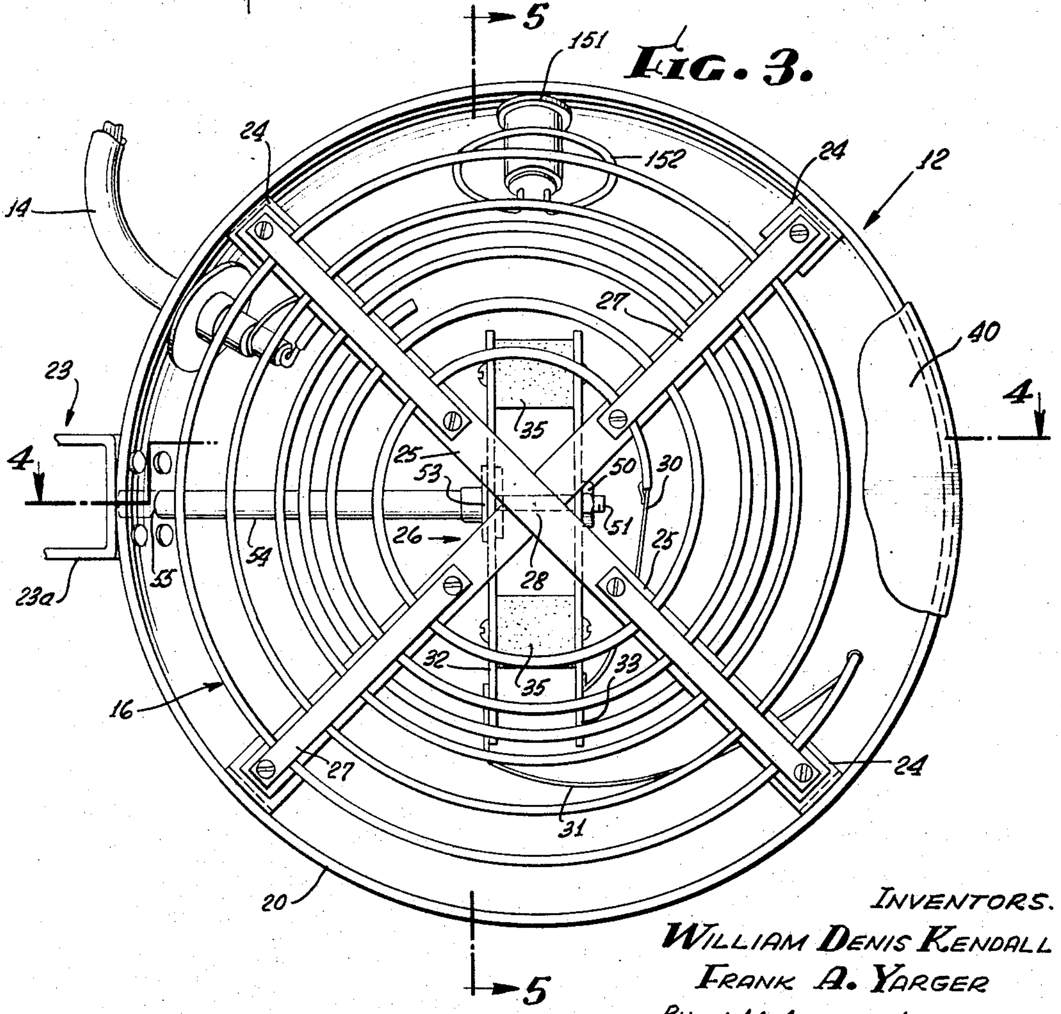
FIG. 3 is a view looking rearwardly into the treatment head interior.
Figure 4:
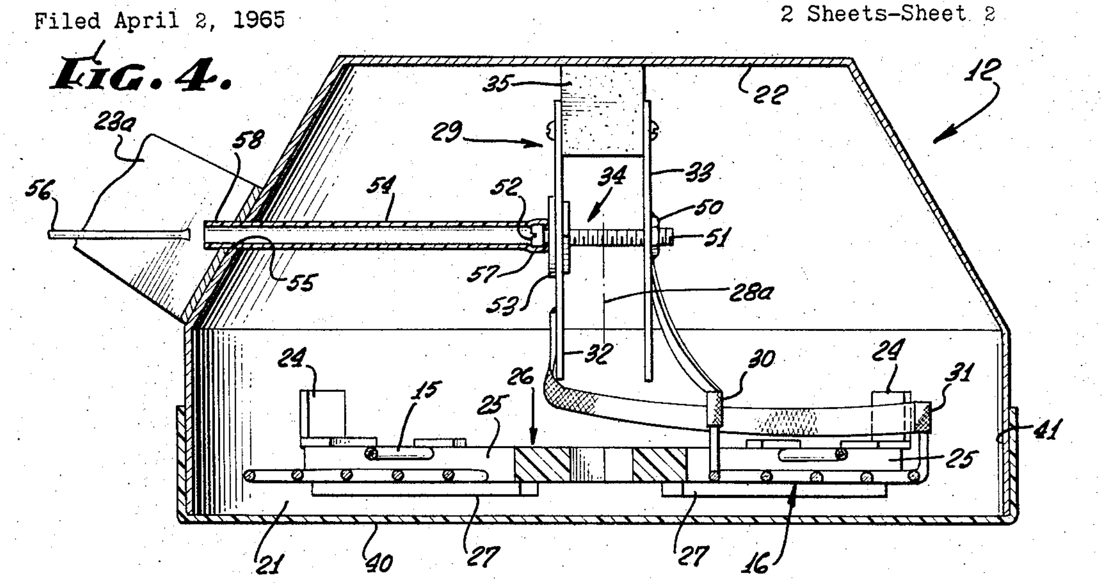
FIG. 4 is a section taken on line 4—4 of FIG. 3.
Figure 5:
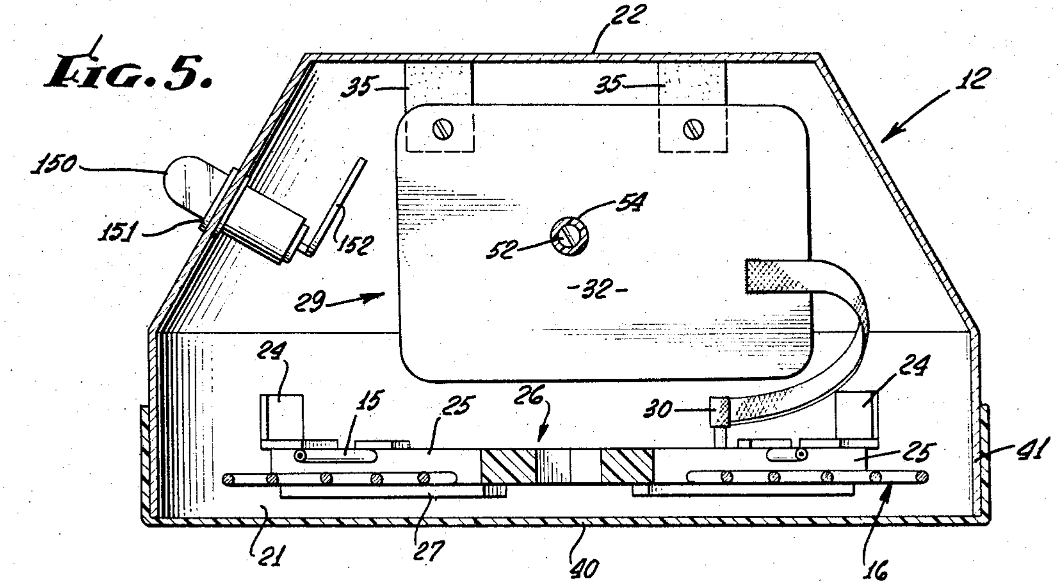
FIG. 5 is a section taken on line 5—5 of FIG. 3.

In FIGS. 3–5 the head is shown in the form of a generally cylindrical, electrically conductive metallic shell 20 having a front opening 21 and a closed rear wall 22, the arm 10 being attached to the shell at 23. Supported by suitable brackets 24 within the shell are the arms 25 of a dielectric spider 26 serving as a support for the appropriately insulatively sheathed primary and secondary coils 15 and 16. The spider arms are typically made of molded tetrafluoroethylene, and carry retainers 27 of the same material for holding the multiple turns of the secondary coil in position forwardly of the single turn primary coil, both coils having central axes which are substantially coincident at 28 to project generally forwardly and rearwardly.

The head structure also includes a capacitor 29 carried within the shell rearwardly of the coils, and having electrical parallel or tank connection with the turned opposite ends of the secondary coil wire, at 30 and 31. Typically, the capacitor has a pair of plates 32 and 33 projecting in planes generally parallel to axis 28*a*. The spacing of the plates is factory set by adjustment of a threaded non-conductive fastener 34 interconnecting the plates. As seen in the drawings, the plates are mounted on dielectric members 35 which are in turn affixed to the rear wall 22 of the shell.

The screw fastener 34 constitutes one desirable form of adjustable tuner for the capacitor carried within the shell, and it consists of a dielectrical material such as nylon to prevent arcing between the plates. Rotation of the screw fastener is resisted by what may be characterized as a flexed condition of the cantilever plates existing while the plates are movable toward and away from each other in response to adjustment of the tuner screw. In this regard, the nylon blocks 35 constitute one desirable form of means mounting the plates and restraining or holding edge portions thereof against such relative movement. A metallic nut 50 soldered to plate 33 receives the threaded shank 51 of the screw 34, and the slotted screw head 52 bears against the metal washer 53 at the outside of plate 32. A Teflon nut is located at the inside of plate 32, and it is seen that both plates are perforated to pass the dielectric shank 51.

Further in accordance with the invention a tubular guide 54 is provided to extend within the shell and in alignment with the tuner and a side opening 55 in the shell to receive insertion of an elongated tool 56 operable to adjust the tuner. Typically, the tubular guide comprises a dielectric material such as a relatively hard yet flexible elastomer or Teflon, so as to flex with the plate or plates, and it has one end portion 57 supported at the screw head 52 and another end 58 supported within the shell opening 55. When tool 56 is inserted in the tube 54, it is guided to the blind location of the head 52 for factory adjustment of the capacitor plate spacing to adjust the treatment head impedance in favorable relation to the patient. Note also that the tube 54 may twist or rotate as the screw head on which it is supported is turned. The terminal 58 of the tubular guide is typically confined between the arms 23*a* of the bracket 23.

To complete the assembly, a cupped protective dielectric closure 40 of thin plastic material is located to cover the forward opening 21 of the shell, and is carried by the shell at 41. Finally, an indicator light 150 is mounted on the shell at 151, and is connected with a wire loop 152 extending within the shell interior in such manner as to generate current for lighting the lamp in response to pulsed operation of the coils, and consequent pulsation of the electromagnetic field within the shell interior.

Figure 6:
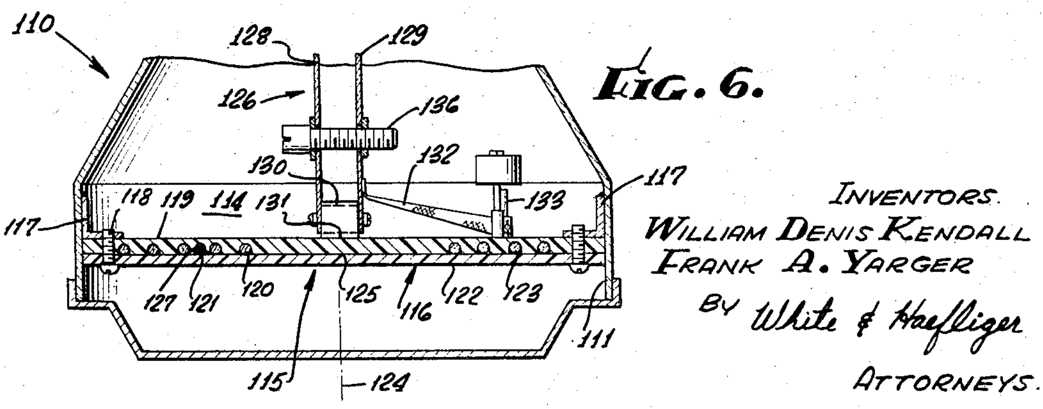
FIG. 6 is a view like FIG. 4, but showing a modified form of head structure.

In FIG. 6, the head includes a shell 110 having a front opening 111 and a closed rear wall supported by a rod or similar member. An assembly 115 is received through the opening 111 into the shell interior 114, the assembly including a dielectric partition 116 extending generally laterally within the shell and supported at its periphery by suitable brackets 117 and fasteners 118. The partition illustrated includes a first dielectric plate 119 containing spiral grooving 120 and 121 opening toward and covered by a second partition plate 122. The grooving 120 receives the turns of a secondary coil 123 spiraling about the longitudinal axis 124 and the shell. The grooving 121 receives the single turn primary coil 127 which is in the interstitial space defined by axial cylinders passing through the successive turns of the secondary coil. Further, the primary and secondary coils haxe approximately coincident centers at the general location 125.

The head structure also includes a capacitor 126 carried within the shell and having electrical parallel connection with the secondary coil. For this purpose, the capacitor includes a pair of plates 128 and 129 projecting in parallel planes generally normal to the lateral extent of the partition 115, the plates being carried by a dielectric block 130 which is suitably attached to the partition at 131, as by bonding thereto. In this regard, the partition and block may comprise a suitable plastic dielectric material, such as Lucite. The plate 129 is shown as electrically connected at 132 to the outer terminal 133 of the secondary coil, while the plate 128 is understood as connected to the inner terminal of the secondary coil. Finally, the spacing of the plates may be factory set by adjustment of a threaded fastener 136 interconnecting the plates, the fastener being non-conductive.

We claim:

1. An improved electrotherapeutic treatment head, comprising a forwardly opening metallic shell, spaced apart inductively coupled primary and secondary coils carried by the shell and facing forwardly relative thereto, the primary coil adapted to be supplied with pulsed electrical energy and the secondary coil adapted to radiate electromagnetic energy generally forwardly, a capacitor carried within the shell to have electrical parallel connection with one of said coils, and adjustable tuner for the capacitor carried within the shell, and a tubular guide extending within the shell in alignment with the tuner and a side opening in the shell to receive insertion of an elongated tool operable to adjust the tuner, said capacitor having a pair of plates movable relatively toward and away from each other while flexed and in response to adjustment of said tuner, and means mounting the plates and restraining portions of both plates against said relative movement, said tuner comprising a dielectric screw fastener projecting between the plates, rotation of said fastener being resisted by the flexed condition of said plates.

2. The combination of claim 1 in which said tubular guide comprises a dielectric material and has one end portion supported at said tuner and another end portion supported at the shell.

3. In combination, an improved electrotherapeutic treatment head, comprising a forwardly opening metallic shell, spaced apart inductively coupled primary and secondary coils carried by the shell and facing forwardly relative thereto, the primary coil adapted to be supplied with pulsed electrical energy and the secondary coil adapted to radiate electromagnetic energy generally forwardly, a capacitor carried within the shell to have electrical parallel connection with one of said coils, and an adjustable tuner for the capacitor carried within the shell, the capacitor having a pair of plates movable relatively toward and away from each other in response to rotary adjustment of said tuner, and dielectric means mounting the plates and restraining edge portions of both plates again said relative movement, said tuner comprising a dielectric screw fastener projecting between the plates, at least one of the plates being flexed to resist rotation of said fastener, a tool projecting lengthwise toward the interior of the shell, and means within the shell to guide lengthwise insertion of the tool from the exterior to the interior of the shell and toward said tuner so that the tool does not contact said plates, said tool being rotatable to rotatably adjust said tuner.

References Cited

UNITED STATES PATENTS

| | | | |
|---|---|---|---|
| 2,243,426 | 5/1941 | Kircher | 331—68 X |
| 3,043,310 | 7/1962 | Milinowski | 128—422 |
| 3,183,912 | 5/1965 | Mogilner | 128—421 |

RICHARD A. GAUDET, *Primary Examiner.*

W. E. KAMM, *Examiner.*